United States Patent
Schlachter et al.

(10) Patent No.: US 9,151,687 B2
(45) Date of Patent: Oct. 6, 2015

(54) MEASURING APPARATUS

(75) Inventors: Marc Schlachter, Wehr (DE); Romuald Girardey, Huningue (FR)

(73) Assignee: Endress + Hauser GmbH + Co. KG, Maulburg (DE)

(*) Notice: Subject to any disclaimer, the term of this patent is extended or adjusted under 35 U.S.C. 154(b) by 650 days.

(21) Appl. No.: 13/515,172

(22) PCT Filed: Nov. 9, 2010

(86) PCT No.: PCT/EP2010/067151
§ 371 (c)(1),
(2), (4) Date: Jun. 11, 2012

(87) PCT Pub. No.: WO2011/082865
PCT Pub. Date: Jul. 14, 2011

(65) Prior Publication Data
US 2012/0283993 A1    Nov. 8, 2012

(30) Foreign Application Priority Data
Dec. 17, 2009    (DE) .......................... 10 2009 054 882

(51) Int. Cl.
G06F 15/00    (2006.01)
G01L 13/00    (2006.01)
G01F 1/36    (2006.01)
G01L 15/00    (2006.01)

(52) U.S. Cl.
CPC ................ *G01L 13/00* (2013.01); *G01F 1/363* (2013.01); *G01L 15/00* (2013.01)

(58) Field of Classification Search
CPC .......... G01F 1/363; G01L 15/00; G01L 13/00
USPC .............................. 702/50, 138, 189; 73/714
See application file for complete search history.

(56) References Cited

U.S. PATENT DOCUMENTS

| | | |
|---|---|---|
| 5,870,695 A | 2/1999 | Brown et al. |
| 2004/0254748 A1 | 12/2004 | Kopp |
| 2007/0209442 A1 | 9/2007 | Takahashi et al. |

FOREIGN PATENT DOCUMENTS

| | | |
|---|---|---|
| DE | 10343057 A1 | 3/2004 |
| DE | 10326249 A1 | 2/2005 |
| WO | 2004/027530 A1 | 4/2004 |

OTHER PUBLICATIONS

German Search Report in corresponding German Application No. 10 2009 054 882.3, dated Dec. 17, 2009.
International Search Report in corresponding PCT Application No. PCT/EP2010/067151, dated Sep. 5, 2011.
English translation of the International Preliminary Report on Patentability, WIPO, Geneva, Jul. 12, 2012.

*Primary Examiner* — John Breene
*Assistant Examiner* — Hien Vo
(74) *Attorney, Agent, or Firm* — Bacon & Thomas, PLLC

(57) ABSTRACT

A measuring apparatus for producing a sequence of measured values of a measured variable, which is a function of a first auxiliary measured variable and at least a second auxiliary measured variable. The apparatus includes a first measuring transducer for registering and for outputting a sequence of values of the first auxiliary measured variable, at least a second measuring transducer for registering and for outputting a sequence of values of the second auxiliary measured variable, an evaluating unit for calculating the sequence of measured values of the measured variable based on the sequences of values of the first auxiliary measured variable and at least the second auxiliary measured variable; wherein the measuring apparatus furthermore has a control unit for synchronizing the registering of the sequences of the first auxiliary measured variable and at least the second auxiliary measured variable by means of a first sequence of control signals, which is output to the first measuring transducer, and a second sequence of control signals, which is output to the second measuring transducer, wherein at least the first sequence of control signals is variable independently of the second sequence of control signals.

9 Claims, 2 Drawing Sheets

MEASURING APPARATUS

TECHNICAL FIELD

The present invention relates to a measuring apparatus for producing a sequence of measured values of a measured variable based on a series of at least two auxiliary measured variables. The measured variable can be especially a pressure difference, wherein the first auxiliary measured variable is a first pressure and the second auxiliary measured variable a second pressure, and wherein the value of the pressure difference is ascertained via difference forming between a measured value of the first pressure and a measured value of the second pressure.

BACKGROUND DISCUSSION

Such a measuring apparatus is described, for example, in German patent application 102008054913. For operation of this type of measuring devices, synchronization of the measured value registering of the first auxiliary measured variable and the second auxiliary measured variable is of importance, since, for example in the case of a flow measurement according to the pressure difference principle with two pressure sensors, a fluctuation of the static pressure in the case of non-synchronized measured value registering would be interpreted as a fluctuation in the flow.

SUMMARY OF THE INVENTION

An object of the invention is, consequently, to provide a measuring apparatus of the field of the invention, which minimizes the time interval between the registering of the auxiliary measured variables.

The measuring apparatus of the invention for producing a sequence of measured values of a measured variable, which is a function of a first auxiliary measured variable and at least one second auxiliary measured variable, includes a first measuring transducer for registering and for emitting a sequence of values of the first auxiliary measured variable, at least a second measuring transducer for registering and for emitting a sequence of values of the second auxiliary measured variable, an evaluating unit for calculating the sequence of measured values of the measured variable based on the sequences of values of the first auxiliary measured variable and at least the second auxiliary measured variable; wherein the measuring apparatus furthermore has a control unit for synchronizing the registering of the sequences of the first auxiliary measured variable and at least the second auxiliary measured variable by means of a first sequence of control signals, which is output to the first measuring transducer, and a second sequence of control signals, which is output to the second measuring transducer; wherein at least the first sequence of control signals is variable independently of the second sequence of control signals.

In a further development of the invention, a first processing time is defined from the registering of a current value of the first auxiliary measured variable up to the outputting of a first reference signal, and a second processing time is defined from the registering of a current value of the second auxiliary measured variable up to the outputting of a second reference signal, wherein the control unit is designed to register at least the respective points in time of the output of the first reference signal and of the output of second reference signal, and, taking into consideration the first and second processing times or a difference between the first and the second processing times, to vary the control signal for at least one measuring transducer, in order to minimize deviations between the point in time of registering the respective current value of the first auxiliary measured variable and at least the point in time of registering the respective current value of the second auxiliary measured variable.

In a further development of the invention, the first reference signal represents a current value of the first auxiliary measured variable or a first checksum, wherein the first checksum is especially to be output after the current value of the first auxiliary measured variable, and wherein the second reference signal represents a current value of the second auxiliary measured variable or a second checksum, wherein the second checksum is especially to be output after the current value of the second auxiliary measured variable.

In a further development of the invention, the first and/or the second measuring transducer includes or include a first and/or a second ASIC for controlling the conversion of the registered values of the first or second auxiliary measured variable, respectively, into a digital value to be output.

In a further development of the invention, the ASIC or the ASICs includes or include a finite state machine for conversion of a registered value and for output of a digitized value of the first and/or second auxiliary measured variable.

In a further development of the invention, the first sequence of control signals includes a first sequence of clock signals, and/or the second sequence of control signals includes a second sequence of clock signals.

In a further development of the invention, the first processing time amounts to a specific first number of clock pulses of the first sequence of clock signals, and/or the second processing time amounts to a specific second number of clock pulses of the second sequence of clocking signals.

In a further development of the invention, a first finite state machine requires a specific first number of clock pulses of the first sequence of clock signals, and/or a second finite state machine requires a specific second number of clock pulses of the second sequence of clocking signals.

In a further development of the invention, the first and/or the second measuring transducer includes an SAR converter, a flash converter or a delta sigma converter for converting the registered values of the respective auxiliary measured variable into a digital value, which is to be output by the respective measuring transducer.

In a further development of the invention, the first auxiliary measured variable is a first pressure, wherein the first measuring transducer includes a first pressure sensor, and the second auxiliary measured variable is a second pressure, wherein the second measuring transducer includes a second pressure sensor, and wherein the measured variable is ascertained as the difference between the first pressure and the second pressure.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
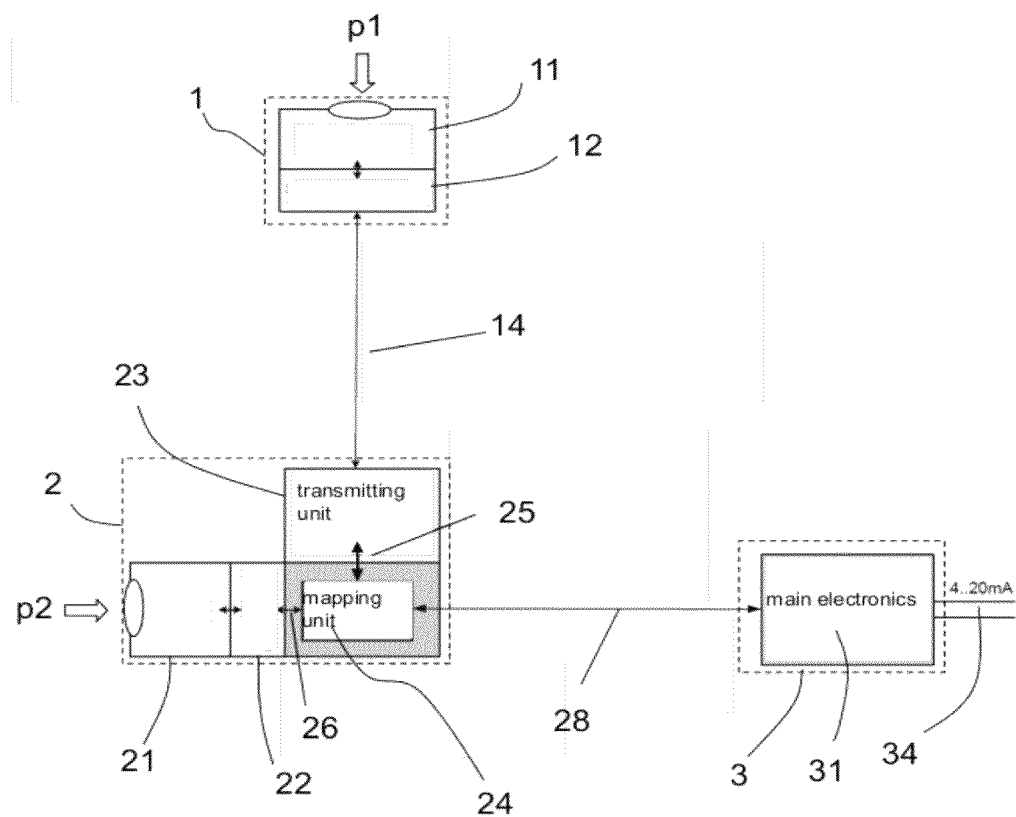
FIG. 1 is a schematic representation of a measuring arrangement of the invention.

The apparatus shown in FIG. 1 includes a first pressure measuring transducer module 1 as a first measuring transducer and a second pressure measuring transducer module 2 as a second measuring transducer, as well as an evaluation module 3.

The first pressure measuring transducer module 1 contains a first pressure sensor 11, which is contactable with a first media pressure p1, and which has a transducer for outputting a first primary signal representing the first media pressure, wherein the transducer can be, for example, a capacitive or (piezo-) resistive transducer. Furthermore, the pressure measuring transducer module contains a first temperature sensor, which registers a temperature of the first pressure sensor, and outputs a temperature signal representing the temperature. The first pressure measuring transducer module furthermore contains a first signal conditioning circuit with an ASIC 12, which first conditions the analog primary signal of the first pressure sensor and, in given cases, the temperature signal, and then digitizes the two signals. The digital signals of the first pressure and the first temperature are transmitted via a first external cable connection 14 to a transmitting unit 23 of the second pressure measuring transducer module 2.

The first external cable connection 14 can have, for example, the following lines:
- a direct voltage supply V+ for supplying the first pressure measuring transducer module,
- a ground wire,
- a clock signal line, which transmits a clock signal with a clock frequency f1 from the second sensor module to the first sensor module, and
- a data line which transmits digital signals of the first pressure and the first temperature, for example at a first transmission rate.

To the extent that such is necessary due to EMC requirements, in addition to the clock signal line and the data line, an additional line can be provided in each case for carrying the corresponding signal with reversed sign.

From the transmitting unit, the digital signals of the first pressure and the first temperature are transmitted via a first internal connection 25 to a mapping unit 24 in the second pressure measuring transducer module 2.

The second pressure measuring transducer module 2 contains, besides the already mentioned transmitting unit 23 and the mapping unit 24, a second pressure sensor 21, which is contactable with a second media pressure p2, and which has a transducer 22 for outputting a second primary signal representing the second media pressure, wherein the transducer can be, for example, a capacitive or (piezo-) resistive transducer. Furthermore, the pressure measuring transducer module contains a second temperature sensor, which registers a temperature of the second pressure sensor 21, and outputs a second temperature signal representing the temperature. The second pressure measuring transducer module furthermore contains a second signal conditioning circuit 22, which first conditions the second analog primary signal of the second pressure sensor and in given cases the second temperature signal and then digitizes the two signals. From the second signal conditioning circuit, the digital signals of the second pressure and the second temperature are transmitted via a second internal cable connection 26 to the mapping unit 24.

In the case of the first and second internal cable connections 25, 26, due to the short transmission paths, symmetrizing opposite phase lines of the clock signal and the data signal can be omitted. Here, besides energy supply, in each case, only a data line with the first transmission rate and a clocking line with the clock frequency f1 are provided.

The mapping unit 24 contains a microcontroller or a FPGA (not shown), which, on the one hand, provides the clock signal for the first pressure measuring transducer module 1 and, on the other hand, registers the incoming digital signals of the first pressure and the first temperature as well as of the second pressure and the second temperature, and outputs signals, which contain information concerning the first pressure and the second pressure as well as the first and the second temperature, for transmission to the evaluation module 3. The transmission to the evaluation module occurs via a second external cable connection 28, which includes, for example, the following lines:
- a direct voltage supply V+ for supplying the second pressure measuring transducer module,
- a ground wire,
- a clock signal line, which transmits a clock signal with the frequency f1 from the evaluation module to the second sensor module, and
- a data line which transmits the signals from the mapping unit 24 to the evaluation module with the first transmission rate or with the halved first transmission rate.

The evaluation module 3 contains the main electronics with a microcontroller for calculating the difference between the first media pressure and the second media pressure, as well as a supply circuit for connection to a two wire loop, on which the calculated pressure difference is output as a 4 . . . 20 mA electrical current signal.

Furthermore, before forming the difference, the microcontroller can, using a compensation algorithm, correct the received pressure measurement values for the first pressure and the second pressure as a function of the associated measured values of temperature.

The supply circuit provides the supply voltages for the main electronics and for the connected modules. Furthermore, the main electronics contains a HART modem, in order to modulate onto the electrical current signal (in given cases digital) signals, which represent one or more of the following measured values: The first pressure, the second pressure, the pressure difference, the first temperature and the second temperature. Furthermore, control commands can be transmitted to the evaluation module via the HART modem.

Essential for the invention is the synchronizing of the measured value registering of the first pressure sensor and of the second pressure sensor. Serving for this is the mapping unit 24, which, as a control unit, receives the conditioned signals of the two ASICs 12, 22 of the pressure measuring transducer modules 1, 2. The transmitting unit 23 arranged between the first ASIC 12 and the mapping unit 24 leads at most to a delay negligible for practical purposes in the data transmission from the first ASIC 12 to mapping unit 24.

Figure 2:
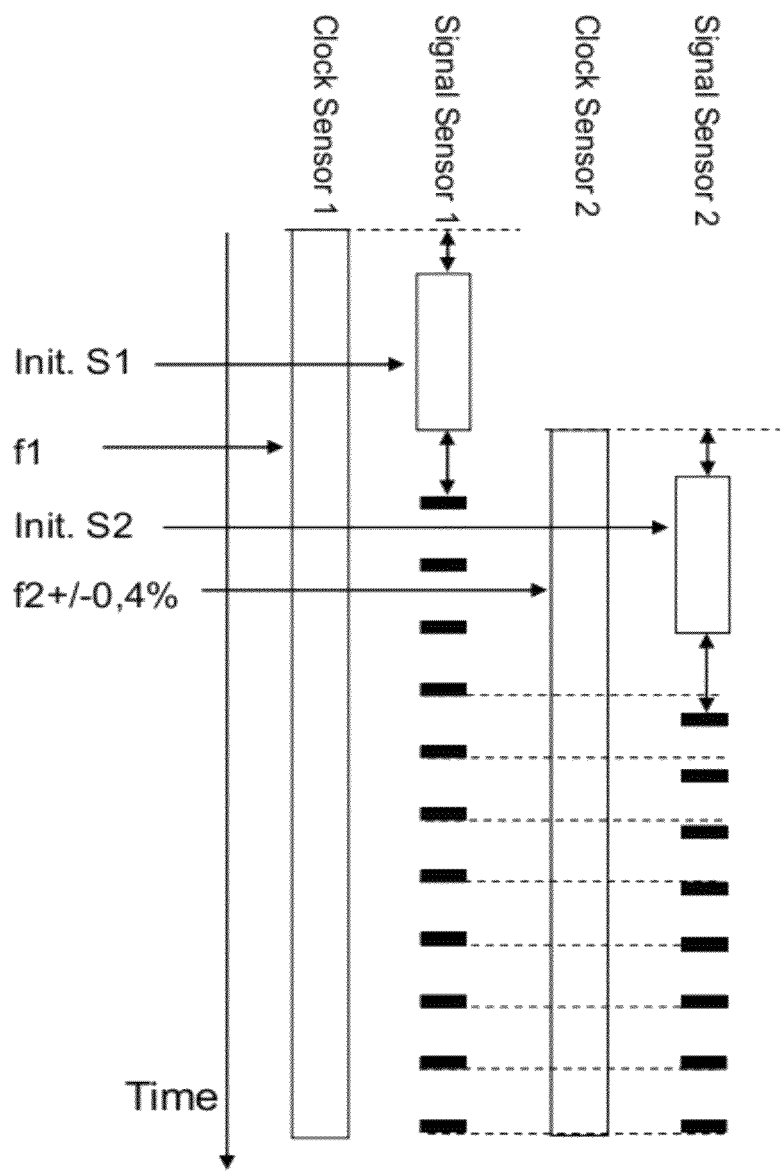
FIG. 2 is a diagram of the data flow in the case of initialization of a measuring arrangement of the invention.

The temporal progression of the signals relevant for synchronizing will now be explained on the basis of FIG. 2. In the initializing of the measuring apparatus, the control unit 24 first sends a first clock signal of, for example, some tens of kHz as a first sequence of control signals to one of the two ASICs, for example, the first ASIC 12. After a not precisely defined tolerance time of, for instance, some tens of milliseconds, the first ASIC 12 sends its initializing code with a length of some 100 bytes. After an additional, not precisely defined tolerance time, the first ASIC 12 begins with the transmission of measured value telegrams, which are then output in a regular sequence, wherein the exact repetition frequency of the measured value telegrams is a function of the first clock signal.

After receipt of the complete initializing code of the first ASIC 12, the control unit 24 begins to transmit a second clock signal as a second sequence of control signals to the second ASIC 22, wherein the second clock signal initially has, for example, for instance, the same frequency as the first clock signal. Likewise, after a not precisely defined tolerance time of, for instance, some ten milliseconds, the second ASIC 22 sends its initializing code with a length of some 100 bytes. After an additional, not precisely defined tolerance time, also the second ASIC 22 begins with the transmission of measured value telegrams, which are then output in a regular sequence, wherein here the exact repetition frequency of the measured value telegrams is a function of the second clock signal.

Without a further synchronizing of the measured value telegrams, the respective current measured values of the first pressure sensor and of the second pressure sensor would exist in an undefined relationship to one another in time, as is recognizable based on a comparison of the receipt times of the first measured value telegrams of the second sensor with those of the measured value telegrams of the first sensor. Via variation of the frequency of one of the clock signals of, for example, the second clock signal by, for example, up to +/−1% or up to +/−0.4%, synchronization of the measured value telegrams can quickly be achieved.

As a measure for the time deviations between the measured value telegrams, the rising edges of the measured value telegrams or their ends can in each case be compared with one another.

Comparison of the ends is advantageous insofar as a measured value telegram usually contains a checksum at the end, which effects that, with synchronizing with the end of the checksum, at the same time, a synchronizing with the validation of the respective measured value telegram is obtained.

The synchronizing of the measured value registering via the measured value telegrams is, of course, only justified when the measured value telegrams exist in a fixed relationship in time to the measured value registering, thus when defined processing times are present. This is especially the case when the conditioning of the measured values occurs via a finite state machine in a defined number of clock pulses.

In the present case, the first pressure measuring transducer and the second pressure measuring transducer have identical processing times. For this reason, a synchronizing of the measured value registering requires here a synchronizing of the measured value telegrams. In the case of unequal but nevertheless defined processing times $t_1$, $t_2$, with, for example, $t_2 > t_1$, a corresponding delay $t_{delay} = t_2 - t_1$ is to be provided, with which the measured value telegrams of the second auxiliary measured variable are to be received after the measured value telegrams of the first auxiliary measured variable.

The invention claimed is:

1. A measuring apparatus for producing a sequence of measured values of a measured variable, which is a function of a first auxiliary measured variable and at least a second auxiliary measured variable, comprising:
   a first measuring transducer for registering and for outputting a sequence of values of said first auxiliary measured variable;
   at least a second measuring transducer for registering and for outputting a sequence of values of said second auxiliary measured variable;
   an evaluating unit for calculating the sequence of measured values of the measured variable based on the sequences of values of said first auxiliary measured variable and at least said second auxiliary measured variable; and
   a control unit for synchronizing the registering of the sequences of said first auxiliary measured variable and at least said second auxiliary measured variable, by means of a first sequence of control signals, which is output to said first measuring transducer, and a second sequence of control signals, which is output to said second measuring transducer, wherein:
   at least said first sequence of control signals is variable independently of said second sequence of control signals;
   a first processing time is defined from a registering of a current value of said first auxiliary measured variable up to outputting of a first reference signal;
   a second processing time is defined from a registering of a current value of said second auxiliary measured variable up to outputting of a second reference signal; and
   said control unit is designed to register at least the respective points in time of output of the first reference signal and of the second reference signal and, taking into consideration the first and second processing times or a difference between the first and the second processing times, and to vary the control signal for at least one measuring transducer, in order to minimize deviations between the point in time of registering the respective current value of said first auxiliary measured variable and at least the point in time of registering the respective current value of said second auxiliary measured variable.

2. The measuring apparatus as claimed in claim 1, wherein:
the first reference signal represents a current value of said first auxiliary measured variable or a first checksum;
the first checksum is to be output especially after the current value of said first auxiliary measured variable;
the second reference signal represents a current value of said second auxiliary measured variable or a second checksum; and
the second checksum is to be output especially after the current value of said second auxiliary measured variable.

3. The measuring apparatus as claimed in claim 1, wherein:
said first and/or said second measuring transducer includes a first and/or second ASIC for controlling conversion of the registered values of said first or said second auxiliary measured variable into a digital value to be output.

4. The measuring apparatus as claimed in claim 3, wherein:
the ASIC or the ASICs has or have a finite state machine for conversion of a registered value and for output of a digitized value of said first and/or said second auxiliary measured variable.

5. The measuring apparatus as claimed in claim 1, wherein:
the first sequence of control signals comprises a first sequence of clock signals, and/or
the second sequence of control signals comprises a second sequence of clock signals.

6. The measuring apparatus as claimed in claim 5, wherein:
the first processing time amounts to a specific first number of clock pulses of the first sequence of clock signals; and/or
the second processing time amounts to a specific second number of clock pulses of the second sequence of clock signals.

7. The measuring apparatus as claimed in claim 6, wherein:
a first finite state machine requires a specific first number of clock pulses of the first sequence of clock signals, and/or
a second finite state machine requires a specific second number of clock pulses of the second sequence of clocking.

8. The measuring apparatus as claimed in claim 6, wherein:
said first and/or said second measuring transducer has a successive approximation register converter, a flash converter or a delta sigma converter for converting the registered values of the respective auxiliary measured variable into digital values to be output by the respective measuring transducer.

9. The measuring apparatus as claimed in claim 1, wherein:
said first auxiliary measured variable is a first pressure, and said first measuring transducer includes a first pressure sensor;
said second auxiliary measured variable is a second pressure and the second measuring transducer includes a second pressure sensor; and
the measured variable is ascertained as a difference between the first pressure and the second pressure.

* * * * *